Dec. 20, 1955  H. G. HARRIES  2,727,695
AIR SWEPT CEREAL GRINDING MILL WITH SEPARATOR
FOR CRACKED AND FLOURED PRODUCTS
Filed Sept. 20, 1951  2 Sheets-Sheet 1

INVENTOR.
Harry G. Harries
BY Cyril M. Hajewski
Attorney

Dec. 20, 1955  H. G. HARRIES  2,727,695
AIR SWEPT CEREAL GRINDING MILL WITH SEPARATOR
FOR CRACKED AND FLOURED PRODUCTS
Filed Sept. 20, 1951  2 Sheets-Sheet 2

INVENTOR.
Harry G. Harries
BY
Cyril M. Hajewski
Attorney

United States Patent Office 2,727,695
Patented Dec. 20, 1955

2,727,695

AIR SWEPT CEREAL GRINDING MILL WITH SEPARATOR FOR CRACKED AND FLOURED PRODUCTS

Harry G. Harries, Hales Corners, Wis.

Application September 20, 1951, Serial No. 247,499

9 Claims. (Cl. 241—56)

This invention relates generally to grinding mills and more particularly to an improved mill for grinding cereal grains.

In producing flour commercially, whether it be whole wheat flour, or the very popular white flour, it is necessary to remove the wheat germ portion of the grain, due to its instability. Because of the nature of our present distribution system, considerable time elapses from the grinding of the wheat into flour until the flour is used by the consumer. It is therefore necessary that the flour be extremely stable in character and capable of being stored for many months without detrimental effect.

The presence of the wheat germ in the flour would render it unstable, causing it to become rancid and unfit for human consumption within a relatively short period of time. It is for this reason that the commercial producers remove the wheat germ in processing the grain. Unfortunately, the greater part of the vitamin content of the grain is contained in the wheat germ, and its removal greatly reduces the nutritional value of commercial flour. As a compromise, commercial producers add synthetic vitamins to replace the ones which have been removed. In addition the bran portion of the grain is removed in producing white flour, and this serves to reduce its mineral content which is essential to the maintenance of good health.

The ideal arrangement for baking of any kind, from the standpoint of both health and flavor, is to use freshly ground whole wheat flour immediately, to thereby preserve its flavor and nutritional value, and preclude its decomposition or attack by insects.

It is therefore a general object of the present invention to provide an improved grinding mill for cereal grains, of a relatively small size with minimum power requirements, suitable for use in the home, bakeries, restaurants, hospitals, and institutions or the like.

Another object of the present invention is to provide a grinding mill having an improved arrangement for feeding the whole grain to the milling chamber.

Another object is to provide an improved mechanism in a grinding mill for selectively adjusting the degree of granulation or fineness of the flour produced.

Another object is to provide an improved grinding mill in which the power requirements remain constant, irrespective of the type of grain being milled, without the adjustment of any valves for controlling the flow of grain within the mill.

Another object is to provide an improved feed control mechanism in a grain grinding mill, for controlling the flow of grain into the grinding chamber.

A further object is to provide an improved grain grinding mill in which the fine flour may be readily separated from the larger particles of grain which may be present.

A still further object is to provide an improved grinding mill of sturdy but simple and inexpensive construction.

According to this invention, an improved grinding mill of relatively small size is provided for grinding grain into flour. The grain to be milled is placed into a hopper fixed to the top of the machine. From the hopper, the flour falls into a spiral chamber formed by a spiral rib fixed to a circular plate. The rib extends downwardly from its associated circular plate so that the bottom face of the spiral channel is open. However, the grain is retained within the channel by a rotating grinding stone disposed directly beneath the open face of the spiral channel, and which revolves in a direction opposite to the progression of the spiral channel. The rib forming the spiral channel has a plurality of openings in series, through which the grain may escape into a grinding chamber, where the grain is ground into flour.

The spiral channel, the openings in the spiral rib forming the channel, and the rotating grinding stone onto which the spiral channel opens, all cooperate to control the flow of grain into the grinding chamber, so that the quantity of grain entering the chamber is such as will maintain maximum operating efficiency. Since the grinding stone is rotating opposite to the progression of the spiral, its rotation tends to urge the grain towards the center of the spiral, away from the grinding chamber. On the other hand, the grain is resting on the rotating grinding stone, and is therefore also driven in an opposite direction by centrifugal force, through the openings in the spiral rib, outwardly from the center of the spiral, toward the grinding chamber. Thus, the grain is acted upon by two opposing forces, so that the amount escaping into the grinding chamber is accurately controlled without adjusting any valves. From the grinding chamber the flour is directed into an air stream which carries it to a cloth sack where it accumulates.

The foregoing and other objects of the invention, which will become more fully apparent from the following detailed description, may be achieved by means of the exemplifying apparatus depicted in and described in connection with the accompanying drawings in which.

Figure 1:
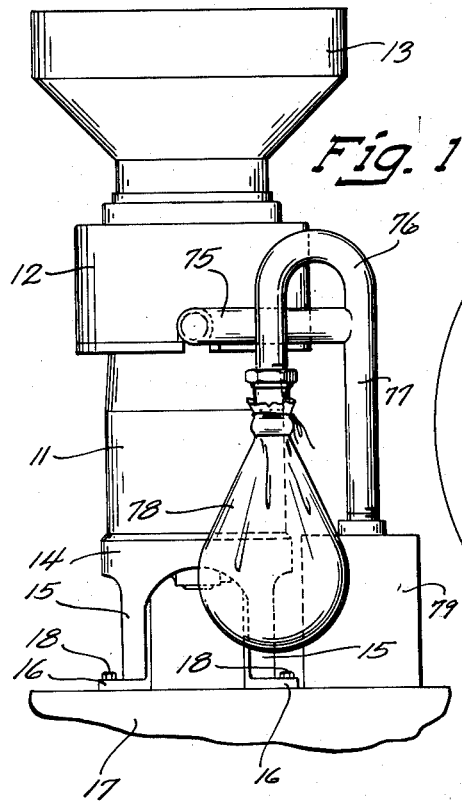
Figure 1 is a view in front elevation of a grinding mill embodying the novel features of the present invention.

Referring more specifically to the drawings and particularly to Figure 1 thereof, the embodiment of the invention there shown, comprises a motor 11, a housing 12, which encloses the grinding mechanism of the machine, and a hopper 13 into which the whole grain is placed, to be fed into the grinding mechanism.

The motor 11 is mounted vertically on a bracket 14 which is supported by four legs 15. The legs 15 are each provided at their lower ends with an ear 16 to rest on a suitable base 17. Holes are formed in each of the ears 16 for the purpose of receiving bolts 18 which serve to rigidly secure the machine to the base 17.

Figure 2:
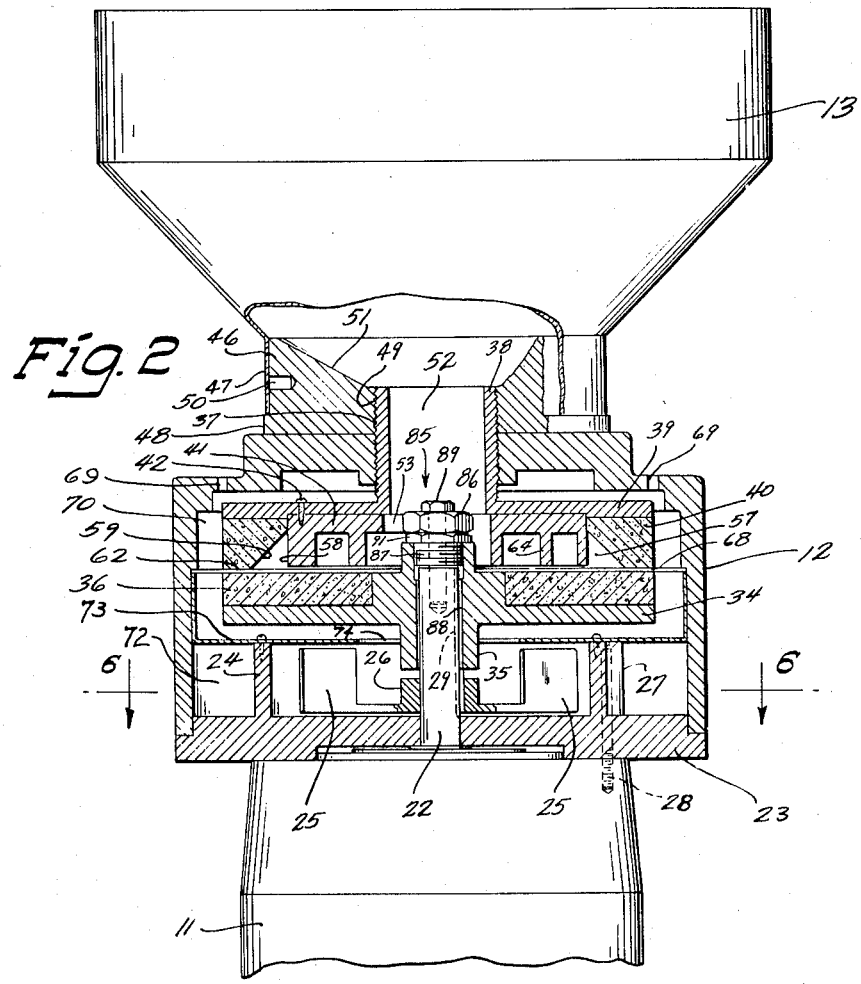
Figure 2 is an enlarged detailed fragmentary view partly in vertical section, illustrating the interior arrangement of the machine depicted in Figure 1.

As clearly shown in Figure 2 the motor 11 has an elongated shaft 22 extending upwardly into the housing 12 through a carrier 23. An upstanding annular ring 24 is fixed to the carrier 23 to form a housing for a plurality of fan blades 25, which extend radially from a central hub 26. Several bosses 27 are formed in the annular ring 24 and are each provided with a bore for receiving a bolt 28 which passes through the boss into threaded engagement with tapped holes formed in the housing of the motor 11. The bolts 28 thus serve to rigidly secure the carrier 23 to the motor 11. The carrier 23, in turn, is secured to the housing 12 by suitable bolts (not shown) to form a unitary structure which may be readily disassembled to effect any necessary adjustments.

The hub 26 is keyed to the motor shaft 22 by means of an elongated key 29 so that the fan blades 25 rotate with the shaft. The elongated key 29 also serves to fix a circular plate 34 to the motor shaft 22, the circular plate 34 having an elongated hub 35 which serves to securely support it on the motor shaft. The upper surface of the plate 34 carries an abrasive stone 36, of circular configuration, having a central opening through which the hub 35 extends, the stone being cemented in position on the plate 34. As the motor 11 is energized to rotate its shaft 22, the fan blades 25, and the abrasive stone 36 rotate with it, due to their keyed connection with the shaft, the stone 36 functioning as the grinding medium for triturating the grain, as will be described.

The top portion of the housing 12 has a threaded opening 37 for engaging a cooperating thread formed on the periphery of an upwardly extending hub 38 of a supporting plate 39. Depending from the plate 39 at its periphery, is an annular abrasive stone 40 having an outer diameter corresponding to the diameter of the plate 39, the stone being rigidly secured to the plate by a suitable cement. Also depending from the plate 39, within the annular stone 40, is a feed control plate 41, which is rigidly secured to the plate 39 by a plurality of screws 42, which pass through holes drilled in the plate into threaded engagement with tapped holes formed in the feed control plate 41.

The hopper 13 is supported on top of the housing 12 by a collar 46. A small diameter 47 of the hopper 13 fits snugly about the peripheral surface of the collar, with its lower edge resting on a flange 48 formed at the lower edge of the collar 46. To provide a sturdy unitary structure, the collar 46 is rigidly secured to the housing 12 by means of its threaded opening 49, which has threaded engagement with the male thread of the hub 38, which extends substantially above the top surface of the housing 12. Such threaded engagement of the collar 46 with the hub 38 serves to secure the collar to the housing 12, as well as lock the plate 39 in position.

The collar 46 is provided with several radial holes 50 about its periphery, into which a suitable rod (not shown) may be inserted to obtain leverage for rotating the collar to acquire tight engagement of its thread with the thread of the hub 38. A tapered surface 51 is formed at the top portion of the collar 46, extending downwardly from the upper edge of its periphery to its inner diameter. This tapered surface 51 serves to funnel the grain from the hopper 13 into a central bore 52 of the hub 38.

The whole grain flows from the bore 52 through a concentric circular opening 53 formed in the feed control plate 41, and thence onto the hub 35 and the rotating abrasive stone 36. The feed control plate 41 in cooperation with the rotating abrasive stone 36 serves to control the rate of flow of grain into an annular grinding chamber 57, of triangular cross section, as clearly shown in Figure 2. The grinding chamber 57 is formed by the stationary peripheral surface 58 of the feed control plate 41, and a chamfered inner edge 59 of the annular abrasive stone 40, with the top surface of the rotating abrasive stone 36 serving as a base for the grinding chamber.

Figure 4:
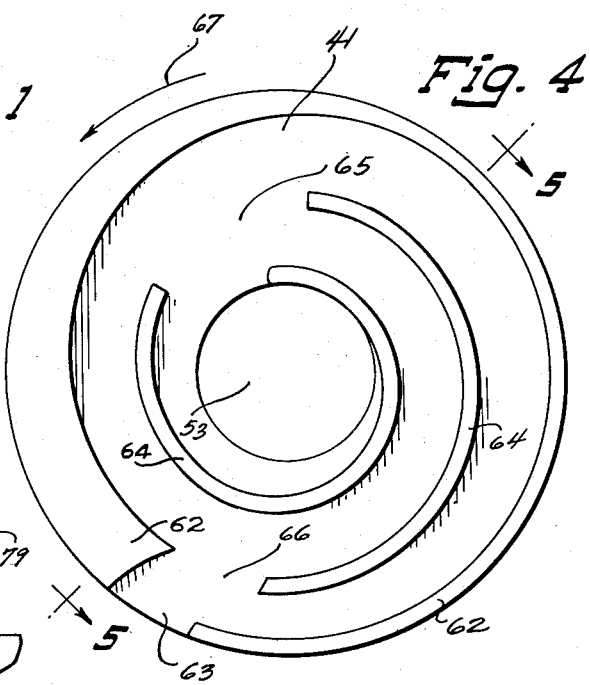
Figure 4 is a detailed bottom view of the feed control plate shown assembled in the machine in Figure 2.
Figure 5:
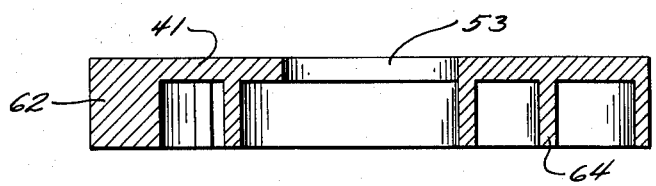
Figure 5 is a detailed view in vertical section of the feed control plate shown in Figure 4, taken along the plane represented by the line 5—5 in Figure 4; and, Figure 6 is a detailed view in horizontal section, taken along the plane represented by the line 6—6 in Figure 2, illustrating the arrangement of the fan in the machine.

As clearly shown in Figure 4, the feed control plate 41 includes a downwardly extending circumferential rib 62 of varying thickness, and of a depth corresponding to the depth of the abrasive stone 40, so that their bottom surfaces are in the same horizontal plane. The rib 62 extends about the entire circumference of the feed control plate 41, except for a break by a relatively small opening 63. In addition the feed control plate 41 is provided with a spiral rib 64 of the same depth as the circumferential rib 62, but which follows the path of a spiral to form a spirally progressing channel of rectangular cross section. The spiral rib 64 starts at a point tangent to the circular opening 53 of the feed control plate 41 and progresses spirally toward the thickest part of the circumferential rib 62.

To permit the passage of grain through the feed control plate 41, the spiral rib 64 has formed therein two openings or gaps 65 and 66, the latter being disposed directly opposite the opening 63 in the circumferential rib 62. It will be noted from Figure 2 that the bottom edges of the circumferential rib 62, the spiral rib 64 and the abrasive stone 40 are all in the same plane, in juxtaposition with the top surface of the rotating stone 36 which functions as a base to enclose the spiral channel as well as the grinding chamber 57. The spiral rib 64 in conjunction with the circumferential rib 62 in combination with their pre-established openings 65, 66, and 63, operate in the manner of a valve to control the flow of grain into the grinding chamber 57.

The abrasive stone 36, onto which the grain from the hopper 13 falls, rotates in a direction opposite to the progression of the spiral, so that as it rotates it tends to urge the grain in the spiral channel 65 towards the beginning of the spiral, at the central portion of the feed control plate 41, away from the grinding chamber 57. Thus, with the spiral formed as illustrated in Figure 4, the rotation of the stone 36 is in the direction of the arrow 67 relative to the view depicted in the drawing. In other words, the motor shaft 22 would be driven in a counter-clockwise direction as viewed from the motor end of the shaft.

Although the rotation of the abrasive stone 36 in cooperation with the spiral channel 65 tends to urge the grain in the channel away from the grinding chamber 57, the grain resting on the stone 36 is also subjected to centrifugal force, by reason of the rotation of the stone 36. Such centrifugal force, on the other hand, tends to urge the grain outwardly of the center of the stone, towards the grinding chamber 57, and causes a portion of it to escape through the openings 65, 66 and 63 into the grinding chamber, where it is triturated into flour. Thus, the centrifugal force created by the rotating stone 36 serves to feed the grain into the grinding chamber, while the tendency of the grain to follow the spiral channel 65 to the center of the stone opposes the effect of the centrifugal force to limit the flow of grain into the grinding chamber.

With this arrangement the amount of grain entering the grinding chamber 57 is accurately controlled, to satisfy the capacity of the machine for grinding grain into flour without feeding an excessive amount. A surplus of grain in the grinding chamber would cause it to pack and thus impair the efficiency of the machine.

With the present construction for controlling the flow of grain into the grinding chamber, it has been found that the load on the motor 11 is directly proportional to the size of the openings 65, 66 and 63, and this load remains constant, irregardless of the type of grain being milled or the degree of fineness desired. In the past, in machines of a similar type, it has been found necessary to provide an adjustable valve somewhere in the path of the grain, to adjust its rate of flow in accordance with the existing conditions. In the present invention, such adjustable valve becomes entirely unnecessary, because the flow of grain is satisfactorily controlled for all conditions, once the size of the openings 65, 66 and 63 has been established for a particular design of machine.

Trituration of the grain in the grinding chamber is accomplished by reason of the abrasive action on the grain by the two stones 36 and 40, produced by the rotation of the stone 36 relative to the stone 40. Once the grain enters the grinding chamber 57, the centrifugal force created by the rotating stone 36 urges it into the apex of the chamber, where it is subjected to the abrasive action of the stones 36 and 40. It is thus ground to a fineness determined by the size of a gap 68 established by the axial spacing of the stones 36 and 40 with respect to each other.

A small portion of the grain will become wedged between the bottom edge of the ribs 62 and 64 and the rotating abrasive stone 36 to be thusly subjected to the abrasive action of the stone causing it to be triturated, but the amount of grain which will be processed in this manner is very small and insignificant. For all practical purposes it may be considered that all trituration occurs in the grinding chamber 57.

Figure 6:
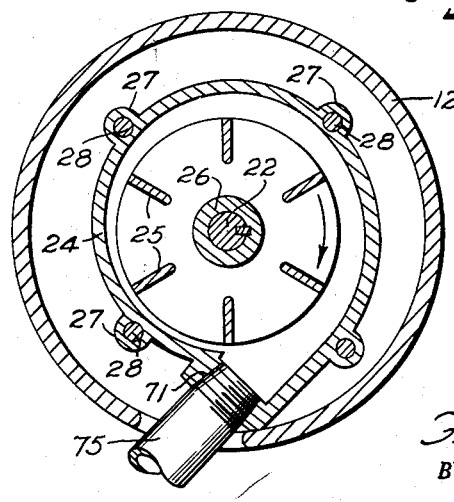

After the grain has been ground fine enough to pass through the gap 68 it is discharged into an air stream created by the rotating fan blades 25. The fan draws air from the exterior of the machine through a series of radial holes 69 drilled in the top surface of the housing 12. The air enters an annular chamber 70 and passes into the fan housing formed by the annular ring 24. The triturated grain discharged from the gap 68 enters the air stream in the chamber 70 and is carried by it into the fan housing where it is discharged through a port 71, depicted in Figure 6.

The annular ring 24 and the housing 12 form an annular channel 72. To prevent the accumulation of grain in this channel, it is covered with a circular cover plate 73, having a central opening 74, through which the grain is carried by the air stream into the fan housing.

The port 71 is provided with an internal thread for receiving a pipe or conduit 75 which extends to the exterior of the machine, where it branches in opposite directions via conduits 76 and 77. The conduit 76 extends upwardly into a one hundred eighty degree curved portion, with its open end having communication with a porous sack 78, fabricated of cloth or other suitable material having a weave of sufficient fineness to confine the flour, but sufficiently porous to permit the air to escape. The flour is in this manner transmitted to the sack 78, where it is retained for subsequent removal.

The conduit 75 also branches downwardly through the conduit 77 which communicates with a sealed container 79. The container 79 is sealed to preclude the flow of air into the conduit 77, limiting its flow upwardly into the conduit 76. The upwardly flowing air will carry the finely ground flour with it into the sack 78. However, if the gap 68 is sufficiently great, only a portion of the grain will be ground finely into flour, and the remaining portion will be discharged into the air stream in the form of relatively larger particles. This latter product is termed "cracked wheat" and is consumed as a breakfast cereal.

The cracked wheat, composed of the larger particles of wheat will be carried by the air stream into the conduit 75. As the air stream is directed upwardly however, into the conduit 76, it is not of sufficient strength to carry the larger particles with it, and these fall by gravity into the container 79. In this manner, the cracked wheat is conveniently and efficiently separated from the flour.

The proportion of cracked wheat and flour to be produced may be readily varied by adjusting the size of the gap 68. The size of this gap is controlled by adjusting the height of either the supporting plate 39 or the circular plate 34, to thereby adjust the position of the abrasive stone 36 relative to the stationary abrasive stone 40.

The height of the supporting plate 39 and therefore the abrasive stone 40 may be readily varied by rotating the collar 46 to loosen its threaded engagement with the hub 48 and unlock the plate 39. The plate 39 may then be rotated in either direction to revolve the thread of the hub 38 with respect to its cooperating thread in the housing 12, and vary the height of the plate 39 and its associated abrasive stone 40 with respect to the housing 12 and the abrasive stone 36.

Figure 3:
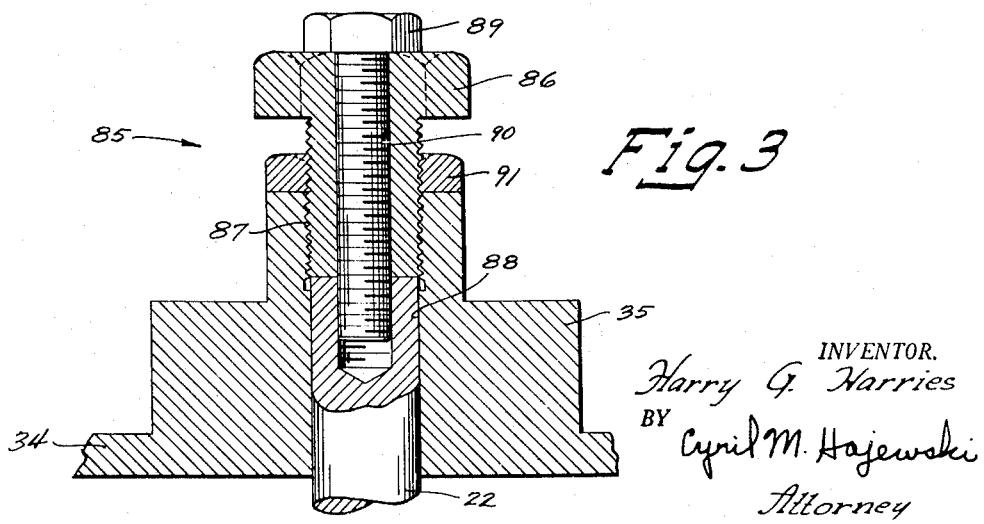
Figure 3 is an enlarged detailed fragmentary view in vertical section of the grinding stone height adjusting mechanism.

The height of the circular plate 34 with its associated abrasive stone 36 is adjusted by means of an adjusting mechanism generally denoted by the numeral 85 and clearly illustrated in Figure 3. The adjusting mechanism 85 comprises a bolt 86 which has threaded engagement with a thread 87 formed in a bore 88 of the hub 35, which supports the circular plate 34. The motor shaft 22 extends upwardly into the bore 88 so that the lower end of the bolt 86 rests upon it. As the bolt 86 is rotated, due to its threaded engagement with the hub 35, its position with respect to the hub 35 will vary but its end will continue to abut the end of the motor shaft 22. Therefore, the position of the hub 35 with respect to the motor shaft 22 will vary, to either raise or lower the circular plate 34 and its associated abrasive stone 36.

When the desired adjustment of the circular plate 34 has been completed, the plate is rigidly secured to the motor shaft 22 by means of a bolt 89, which passes through an axial bore 90 formed in the bolt 86, into threaded engagement with a tapped hole in the end of the motor shaft 22. Thus, by tightening the bolt 89, the bolt 86 is securely fixed to the motor shaft 22. The circular plate 34 in turn, is locked in position on the bolt 86 by tightening a lock nut 91. In this manner the bolt 86 is rigidly secured to the motor shaft 22, and the circular plate 34 in turn is rigidly secured to the bolt 86, to form a sturdy unitary structure which may be readily disassembled for the purpose of adjustment.

From the foregoing detailed description and explanation of the operation of a specific embodiment of this invention, it is apparent that there has been provided an improved grinding mill for the convenient and efficient grinding of grain to the desired fineness, and having a superior feed rate control mechanism for controlling the flow of whole grain into the grinding chamber.

Although but a single embodiment of the invention has been set forth in considerable detail to constitute a full disclosure, it is to be understood that persons skilled in the art may utilize the novel principles here taught, in apparatus differing in construction from the particular mechanism herein described without departing from the spirit and scope of the invention, as defined in the subjoined claims.

The principles of the invention having now been fully explained in connection with the foregoing description of embodying structure, I hereby claim as my invention:

1. In a grinding mill, a motor having an upwardly extending shaft, a flat abrasive stone mounted on said shaft to rotate with it, a feed control plate supported concentrically above said flat abrasive stone and having a central opening through which grain is admitted to fall upon said flat abrasive stone, a spiral rib extending downwardly from said feed control plate so that its outer edge is contiguous to the upper face of said flat abrasive stone to form a spiral channel, said spiral rib having a plurality of openings and progressing from the central portion of said feed control plate in a direction opposite to the direction of rotation of the flat abrasive stone to the circumference of said feed control plate, a circumferential rib secured to said feed control plate at its periphery and extending downwardly approximately the same distance as said spiral rib, said circumferential rib having an opening through which the grain may escape, and an annular abrasive stone mounted so that its inner diameter adjoins the periphery of said feed control plate and its lower surface is adjacent the upper face of said flat abrasive stone to form a gap therewith, the inner diameter of said annular abrasive stone being chamfered, to form with the peripheral surface of said circumferential rib, an annular grinding chamber, whereby said spiral channel limits the escape of grain through said openings, to thereby control the flow of grain into said grinding chamber where it is triturated and discharged through said gap.

2. In a grinding mill, a housing having air intake openings in its upper portion and a material discharge port in its lower portion, a motor supported with its drive shaft extending upwardly into said housing, a fan connected to be driven by said motor, and arranged to draw air from said air intake openings in the upper portion of said housing and direct it vertically downwardly to discharge it from the housing through said material discharge port to create a downwardly moving air stream in said housing, a flat abrasive stone keyed to said motor shaft, a feed control plate supported by said housing concentrically above said flat abrasive stone and having a central opening through which grain is admitted to fall upon said flat abrasive stone, a rib extending downwardly from said feed control plate so that its outer edge is contiguous to the upper face of said flat abrasive stone, said rib having a plurality of openings and being formed to follow the path of a spiral progressing from the central portion of said feed control plate toward its circumference to form a spiral channel, and an annular abrasive stone mounted in said housing so that its inner diameter adjoins the periphery of said feed control plate, and its lower surface is adjacent the upper face of said flat abrasive stone to form a gap therewith which opens into said downwardly moving air stream, the inner diameter of said annular abrasive stone being chamfered to form an annular grinding chamber, whereby said spiral chamber limits the escape of grain through said openings, to thereby control the flow of grain into said grinding chamber where it is triturated and discharged through said gap into the air stream to be carried out of the machine.

3. In a machine of the character described, a housing having air intake openings in its upper portion and a material discharge port in its lower portion, a motor supported with its drive shaft extending upwardly into said housing, a fan connected to be driven by said motor and disposed to draw air from said air intake openings in the upper portion of said housing and direct it vertically downwardly to discharge it from the housing through said material discharge port to create a downwardly moving air stream in said housing, a hopper mounted on top of said housing to receive the material to be ground, a flat abrasive stone keyed to said motor shaft, a feed control plate supported by said housing concentrically above said flat abrasive stone and having a central opening communicating with said hopper to admit the material to be ground to fall on said flat abrasive stone, said feed control plate also having formed on its lower face a spiral channel with a series of openings and its open side contiguous to said flat abrasive stone, said spiral channel starting at a point in communication with said central opening to receive the material passing through the central opening and progressing in a direction opposite to the direction of rotation of the flat abrasive stone to the circumference of said feed control plate, and a grinding chamber disposed to receive the material discharged from the end of said spiral chamber to triturate it and discharge the ground material into said downwardly moving air stream which carries it out of the machine through said material discharge port.

4. In a grinding mill, a rotor, a housing, a shaft driven by said motor and extending upwardly in said housing, a plate slidably keyed to said shaft through a threaded bore, an adjusting bolt in threaded engagement with the threaded bore of said plate and abutting the end of said shaft within the bore so that the axial position of said plate with respect to said shaft may be adjusted in either direction by rotating said adjusting bolt relative to said plate, a locking bolt passing through an axial bore in said adjusting bolt, into threaded engagement with a threaded axial hole in the end of said shaft to secure said adjusting bolt to said shaft, a lock nut in threaded engagement with said adjusting bolt so that it may be tightened against said plate to lock it in position with respect to said adjusting bolt, a flat abrasive stone mounted on said plate to rotate with it, a feed control plate supported by said housing above said flat abrasive stone and having a central opening through which grain is admitted to fall upon said rotating flat abrasive stone, said feed control plate having formed on its lower face, a spiral channel with an open side facing said flat abrasive stone, said spiral channel starting at a point in communication with said central opening to receive the grain passing through it, and progressing outwardly to the circumference of said feed control plate, and an annular abrasive stone mounted so that its inner diameter adjoins the periphery of said feed control plate and its lower surface is adjacent the upper face of said flat abrasive stone to form a gap therewith, the size of the gap being adjustable by adjusting the position of said plate on said shaft to thereby move it relative to said annular abrasive stone, said annular abrasive stone having a chamfered inner diameter to form a grinding chamber which communicates with the end of said spiral channel wherein the grain escaping from said channel is triturated to a degree of fineness sufficient to permit it to be discharged through said gap, whereby said spiral channel limits the escape of grain to prevent an excessive amount from accumulating in the grinding chamber.

5. In a grinding mill having a grinding chamber where the material is triturated, a housing, a feed control plate suspended from the top of said housing having a central opening through which grain is admitted and a spiral channel formed on its lower face, said spiral channel starting from a point in communication with said central opening to receive the material passing through it, and progressing to the circumference of said feed control plate into communication with said grinding chamber, a motor, a shaft driven by said motor and extending upwardly in said housing, a plate slidably keyed to said shaft through a threaded central bore, a flat abrasive stone secured to the upper surface of said plate and directly facing an open bottom side of said spiral channel to thereby close the channel except for its ends, said flat abrasive stone being adjustable axially relative to said spiral channel by means of an adjusting mechanism comprising an adjusting bolt in threaded engagement with the threaded bore of said plate and abutting the end of said shaft within the bore so that the axial position of said plate with respect to said shaft, and therefore the position of said abrasive stone with respect to said spiral channel, may be adjusted in either direction by rotating said adjusting bolt relative to said plate, and a locking bolt passing through an axial bore in said adjusting bolt, into threaded engagement with a threaded axial hole in the end of said shaft to secure said adjusting bolt to said shaft, whereby the position of said flat abrasive stone with respect to said spiral channel may be adjusted so that it will act upon the material entering the spiral channel to urge it through the channel and discharge it therefrom into the grinding chamber where it is triturated.

6. A mounting mechanism comprising, a shaft having a threaded hole formed axially in its supporting end, a member supported on said shaft having a threaded bore into which said shaft is slidably inserted, an adjusting bolt with an axial bore having threaded engagement with the threaded bore of said member so that its end abuts the end of said shaft in the bore, a locking bolt passing through the axial bore of said adjusting bolt into threaded engagement with the threaded hole of said shaft to secure said adjusting bolt to said shaft, and a lock nut in threaded engagement with said adjusting bolt so that it may be tightened against said member to lock it in position with respect to said adjusting bolt, whereby upon loosening said lock nut and locking bolt, said adjusting bolt may be threaded in either direction with respect to said member to cause said member to slide in a corresponding direction on said shaft, while said adjusting bolt will retain its abutting engagement with the end of said shaft.

7. An adjustable mounting comprising, a shaft having a threaded axial hole in its end, a member having a threaded bore into which the threaded end of said shaft is slidably inserted, an adjusting bolt with an axial bore, in threaded engagement with the threaded bore of said member so that its end abuts the end of said shaft within the threaded bore of said member, and a locking bolt passing through the axial bore of said adjusting bolt into threaded engagement with the threaded hole of said shaft, to lock said adjusting bolt to said shaft, whereby upon loosening said locking bolt, said adjusting bolt may be rotated to adjust its position with respect to said member by reason of its threaded engagement therewith, causing said member to adjust its position with respect to said shaft.

8. In a grinding mill, a motor, a housing, a shaft mounted in said housing and connected to be driven by said motor, a fan keyed to said shaft at the lower portion of said housing and arranged to draw air from a plurality of openings in said housing and discharge it through a port to create an air stream within the housing, a flat abrasive stone mounted on said shaft to rotate with it, a feed control plate secured to said housing and having formed on its face a channel with an open side in juxtaposition with the face of said flat abrasive stone which serves to close the channel, said channel being constructed and arranged to receive the material to be ground at one end and discharge it at its other end, the material being urged through said channel by the action of the rotating abrasive stone upon which the material in the channel rests, a grinding chamber disposed to receive the material discharged from said channel to triturate it and discharge the ground material into said air stream which carries it out of said housing through said port, a horizontal conduit connected to said port, an upwardly extending conduit branching from said horizontal conduit, a downwardly extending conduit branching from said horiozntal conduit, a porous container connected to the end of said upwardly extending conduit to confine the ground material carried by said air stream without interrupting the flow of air through it, and a sealed container connected to the end of said downwardly extending branch, whereby the air stream will carry the finely ground material into the upwardly extending conduit to the porous container, while the larger particles of material will drop by gravity through the downwardly extending conduit into said sealed container.

9. In a grinding mill, a motor, a housing, a fan connected to be driven by said motor, said fan being constructed and arranged to create an air stream in said housing and to discharge the air through a port in the housing, a hopper mounted on top of said housing to receive the material to be ground, a flat abrasive stone connected to be rotated by said motor, a feed control plate supported by said housing above said flat abrasive stone and having a central opening communicating with said hopper to admit the material to be ground to fall on said flat abrasive stone, said feed control plate also having formed on its lower face a spiral channel with a series of openings and its open side contiguous to said flat abrasive stone, said spiral channel starting at a point in communication with said central opening to receive the material passing through it and progressing to the circumference of said feed control plate, the material being urged through said spiral channel by the action of said rotating abrasive stone upon which it rests while in the channel, a grinding chamber disposed to receive the material discharged from the end of said spiral chamber to triturate it and discharge the ground material into said air stream which carries it to said port, an upwardly extending conduit connected to said port, a porous container connected to said upwardly extending conduit to confine the finely ground material therein without interrupting the flow of air, a downwardly extending conduit connected to said port, and a sealed air tight container connected to the end of said downwardly extending conduit, whereby the air stream will carry the finely ground material into the upwardly extending conduit to the porous container, while the larger particles of material will drop by gravity through the downwardly extending conduit into said sealed container.

References Cited in the file of this patent

UNITED STATES PATENTS

| | | |
|---|---|---|
| 755,989 | Baker et al. | Mar. 29, 1904 |
| 815,126 | Smith | Mar. 13, 1906 |
| 957,130 | Wear | May 3, 1910 |
| 1,220,147 | Wear et al. | Mar. 20, 1917 |
| 1,257,429 | Warstler | Feb. 26, 1918 |
| 1,816,050 | Lee | July 28, 1931 |
| 1,987,941 | Mathews | Jan. 15, 1935 |
| 2,058,175 | Pinkerton et al. | Oct. 20, 1936 |
| 2,121,275 | Zober | June 21, 1938 |
| 2,445,617 | Hofmann | July 20, 1948 |
| 2,519,198 | Richeson | Aug. 15, 1950 |

FOREIGN PATENTS

| | | |
|---|---|---|
| 101,812 | Switzerland | Oct. 16, 1923 |
| 248,789 | Switzerland | Mar. 1, 1948 |
| 351,007 | Italy | July 31, 1937 |
| 503,853 | France | Mar. 27, 1920 |
| 880,818 | France | Apr. 6, 1943 |